(12) United States Patent
Bohr et al.

(10) Patent No.: US 12,280,655 B2
(45) Date of Patent: Apr. 22, 2025

(54) METHOD AND SYSTEM FOR SIDE MOUNT FUEL TANK

(71) Applicant: Ford Global Technologies, LLC, Dearborn, MI (US)

(72) Inventors: Scott Alan Bohr, Novi, MI (US); Aed Dudar, Canton, MI (US); Frank Topolovec, Canton, MI (US); Chuck Bartus, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 18/052,518

(22) Filed: Nov. 3, 2022

(65) Prior Publication Data
US 2024/0149664 A1  May 9, 2024

(51) Int. Cl.
  *B60K 15/035* (2006.01)
  *B60K 15/04* (2006.01)

(52) U.S. Cl.
  CPC ............ *B60K 15/035* (2013.01); *B60K 15/04* (2013.01)

(58) Field of Classification Search
  CPC .............................. B60K 15/035; B60K 15/04
  USPC ......................................................... 280/834
  See application file for complete search history.

(56) References Cited

U.S. PATENT DOCUMENTS

| | | | |
|---|---|---|---|
| 5,067,468 A * | 11/1991 | Otowa | B60K 15/04 123/520 |
| 5,937,922 A | 8/1999 | Hör et al. | |
| 6,012,599 A | 1/2000 | Miura et al. | |
| 6,123,118 A | 9/2000 | Nanaji | |
| 6,550,811 B1 * | 4/2003 | Bennett | F02M 37/007 280/833 |
| 8,991,421 B2 | 3/2015 | Geurtz | |
| 11,493,001 B1 | 11/2022 | Dudar et al. | |
| 2003/0056837 A1 | 3/2003 | Benjey | |
| 2003/0089424 A1 | 5/2003 | Gabbey et al. | |
| 2008/0142111 A1 | 6/2008 | Osterbrink et al. | |
| 2016/0082910 A1 * | 3/2016 | Sloan | B60R 19/023 293/128 |
| 2016/0229286 A1 * | 8/2016 | Baik | B60K 15/03519 |

FOREIGN PATENT DOCUMENTS

| | | | |
|---|---|---|---|
| JP | 08118972 A | * | 5/1996 |
| KR | 19990057961 A | * | 7/1999 |
| KR | 20100047643 A | * | 5/2010 |

(Continued)

OTHER PUBLICATIONS

KR-19990057961-A (Jul. 15, 1999) (Machine Translation) (Year: 1999).*

(Continued)

*Primary Examiner* — Mahmoud Gimie
(74) *Attorney, Agent, or Firm* — Vincent Mastrogiacomo; McCoy Russell LLP (57) ABSTRACT

Methods and systems are presented for collecting fuel vapors in a fuel system that includes a side mount fuel tank. The methods and systems may allow fuel vapors to be captured during filling of the side mount fuel tank. In one example, the side mount fuel tank is fitted with a fuel filler tube that extends into the side mount fuel tank so that fuel vapors may be captured while the side mount fuel tank is being filled.

20 Claims, 5 Drawing Sheets

(56) References Cited

FOREIGN PATENT DOCUMENTS

KR 101690666 B1 * 12/2016

OTHER PUBLICATIONS

Dudar, A et al., "Canister Capacity Diagnostics for Evaporative Emissions Control System in Heavy Duty Vehicles" U.S. Appl. No. 17/650,505, filed Feb. 9, 2022, 66 pages.
Dudar, A. et al., "Methods and Systems for Fuel System" U.S. Appl. No. 17/653,108, filed Mar. 1, 2022, 47 pages.

* cited by examiner

METHOD AND SYSTEM FOR SIDE MOUNT FUEL TANK

FIELD

The present description relates generally to methods and systems for managing fuel vapors in a fuel system that includes a side mount fuel tank.

BACKGROUND/SUMMARY

A heavy commercial vehicle may include one or more side mount fuel tanks. The side mount fuel tanks may be mounted outside of the vehicle's frame rails so that easy access to the fuel tank is provided and so that various types of bodies may be fitted to the vehicle's frame rails. Heretofore, evaporative emissions of heavy commercial vehicles may have been less of a priority than evaporative emissions of personal vehicles. However, evaporative regulatory emissions standards for heavy commercial vehicles have become increasingly stringent and have grown to include evaporative emissions that may be related to refilling a fuel tank. Side mount fuel tanks combined with regulatory standards to control of evaporative emissions when filling side mount fuel tanks provide a new challenge for evaporative emissions. In particular, side mount fuel tanks include a fuel filler inlet, but the fuel filler inlet is short and it includes no means for capturing fuel vapors during fuel filling. Therefore, it may be desirable to provide a side mount fuel tank that has a design that allows for capture of fuel vapor during fuel refilling of the side mount fuel tank.

The inventors herein have recognized the above-mentioned issue and have developed a fuel system, comprising: a side mount fuel tank configured to mount outside of frame rails of a vehicle, the side mount fuel tank including a fuel filler inlet and a fuel fill pipe that extends inside the side mount fuel tank beginning at the fuel filler inlet and ending within the side mount fuel tank, the fuel fill pipe including a hole positioned within an area of the side mount fuel tank that is outside of an area allocated to liquid fuel.

By installing a fuel fill pipe that includes a hole into a side mount tank, it may be possible to provide the technical result of trapping fuel vapors in a fuel vapor storage system that includes a side mount fuel tank. In particular, the hole may be positioned in an area of a fuel tank that is outside of an area of the fuel tank that stores liquid fuel. This allows gases to flow from the fuel tank and into the fuel fill tube so that less fuel vapor remains in an area of the fuel tank that is in communication with a carbon filled canister. Consequently, a smaller volume carbon filled canister may be used to capture fuel vapors in the fuel system.

The present description may provide several advantages. In particular, the approach may allow a small volume carbon filled canister to store fuel vapors in a fuel system. Additionally, the approach allows fuel vapors to be captured in a fuel system that includes one or more side mount fuel tanks. Further, the approach may be implemented with fewer conduits than a conventional fuel vapor storage system because a hole in a fuel filler tube provides a path for fuel vapors inside of the side mount fuel tank.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
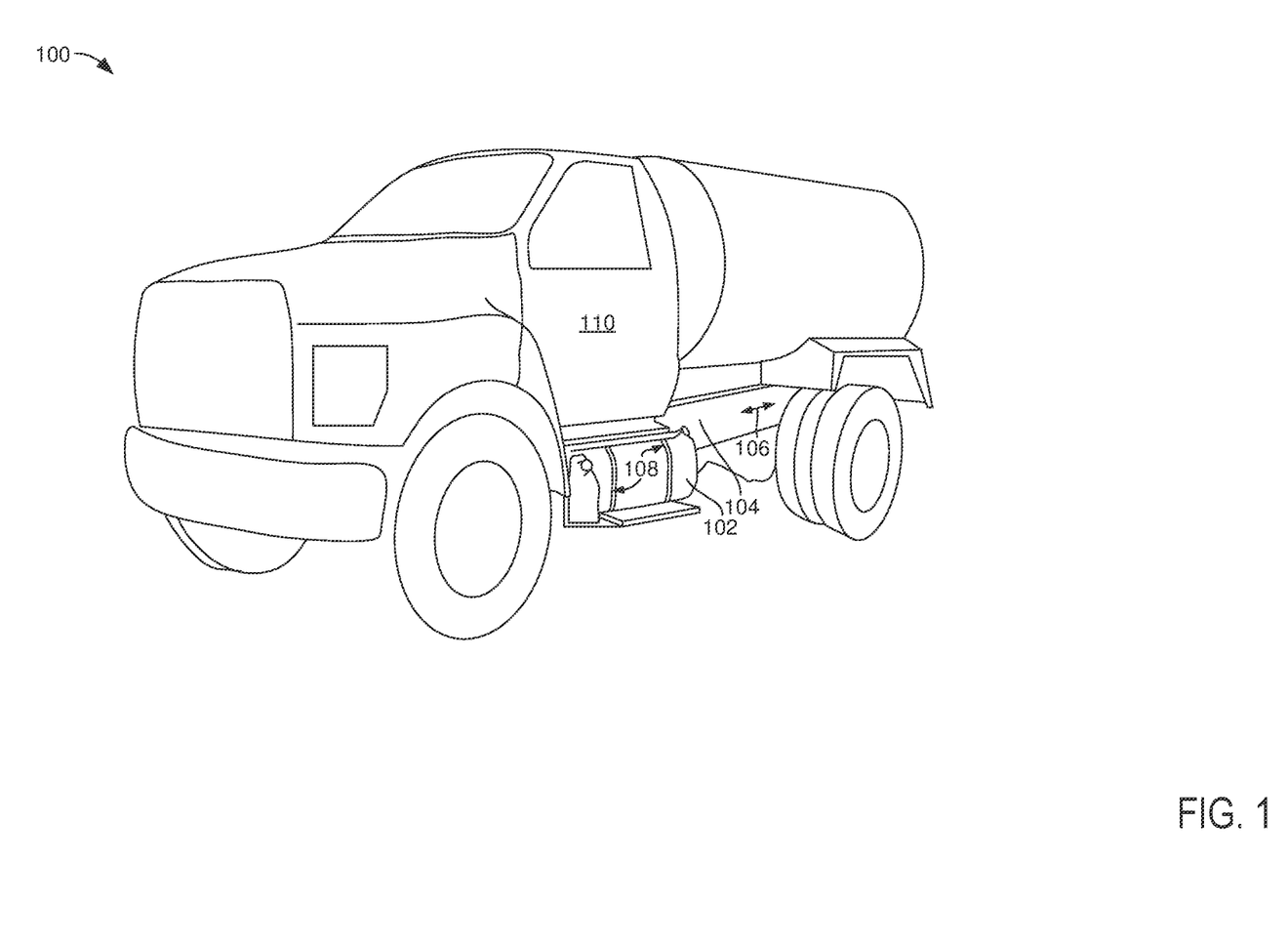
FIG. 1 shows an example vehicle that may be included in the systems and methods described herein.
Figure 2:
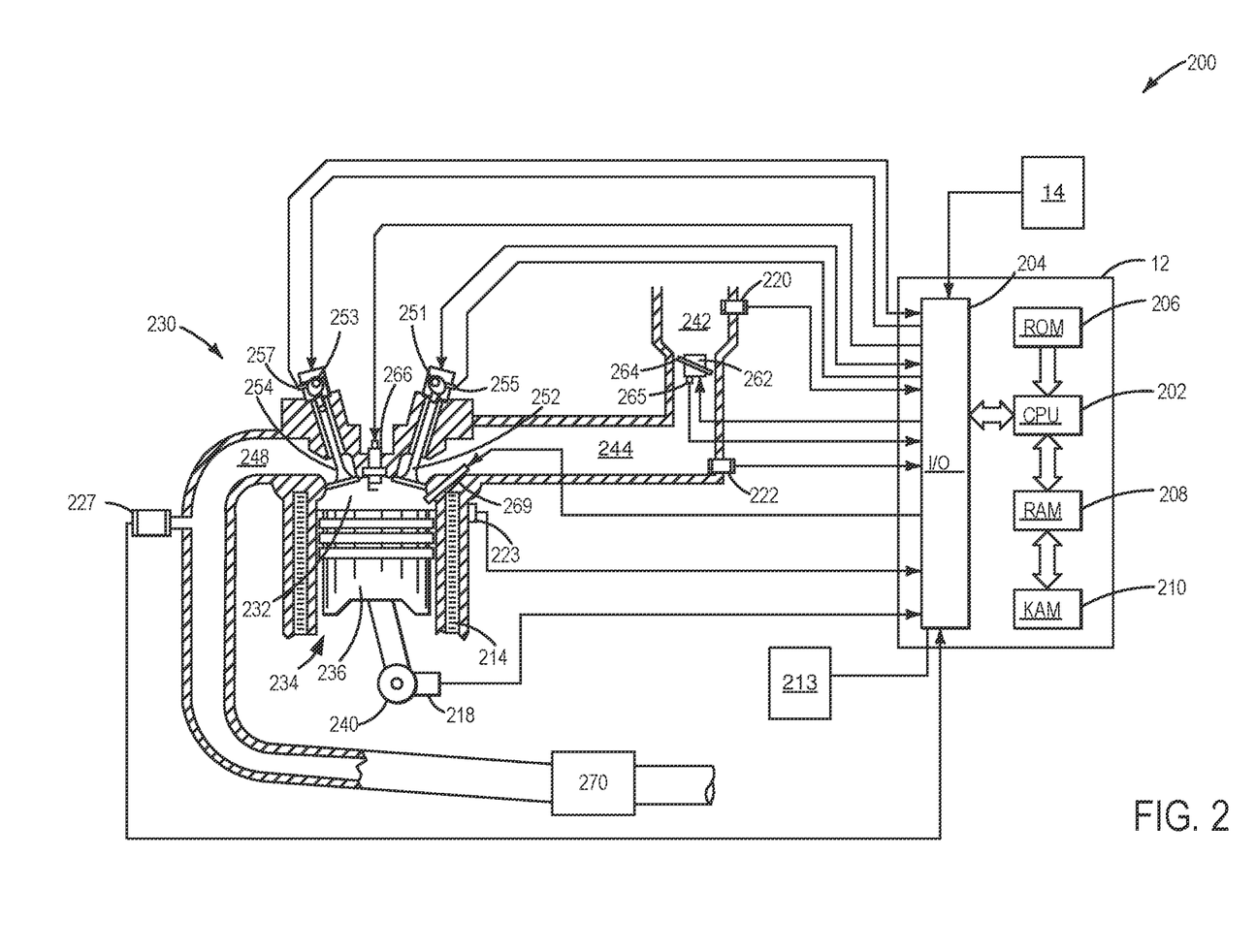
FIG. 2 shows an example engine that may be coupled to a fuel vapor storage system.
Figure 3:
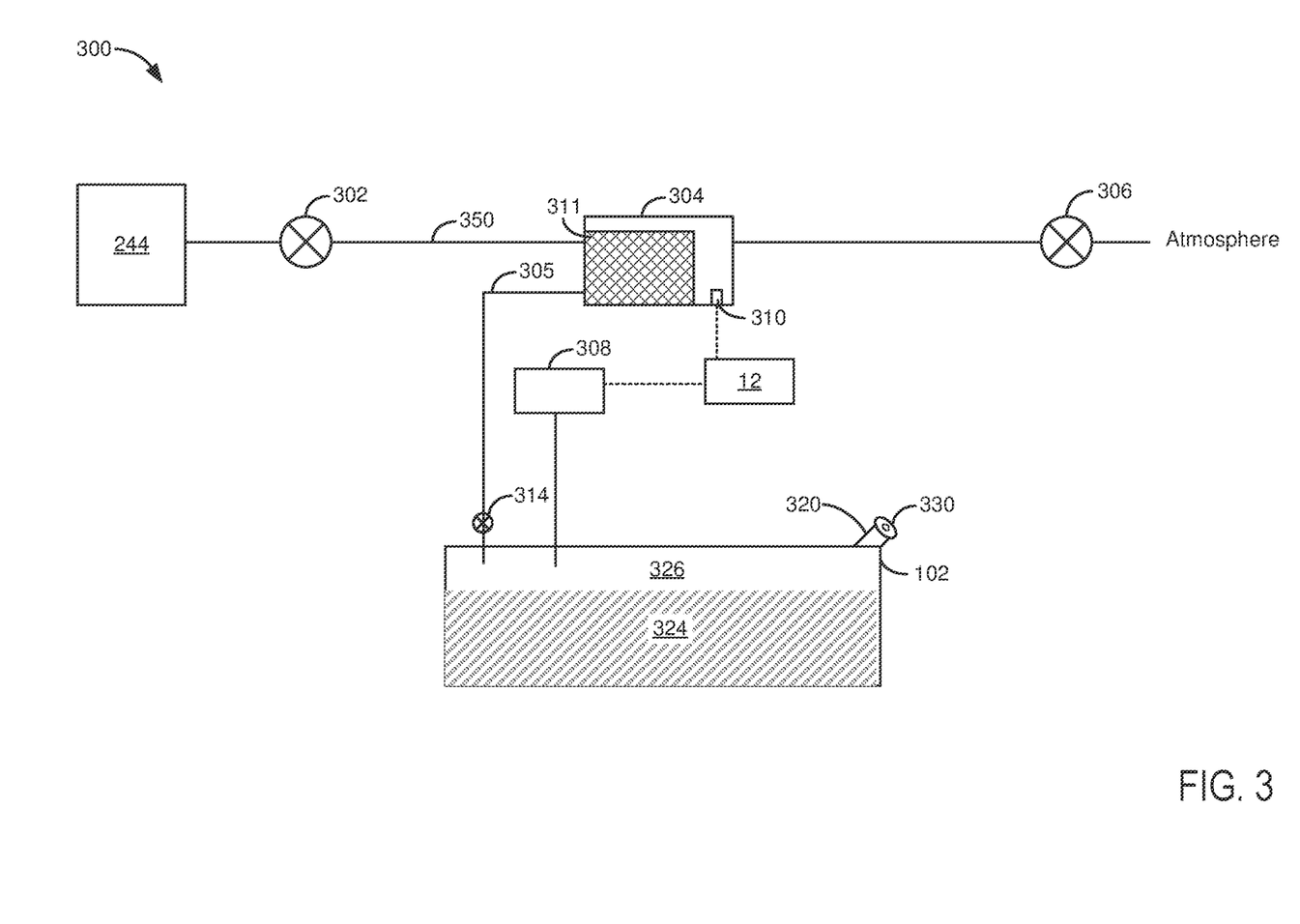
FIG. 3 shows a schematic of an example fuel vapor storage system.
Figure 4:
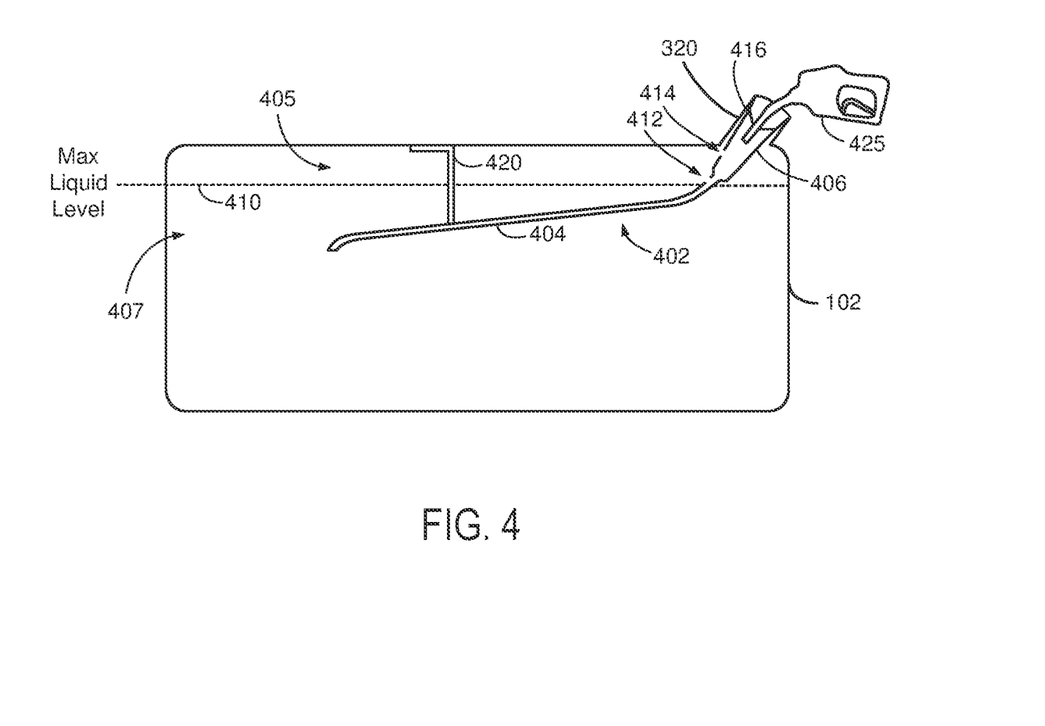
FIG. 4 shows a cutaway view of an example side mount fuel tank.
Figure 5:
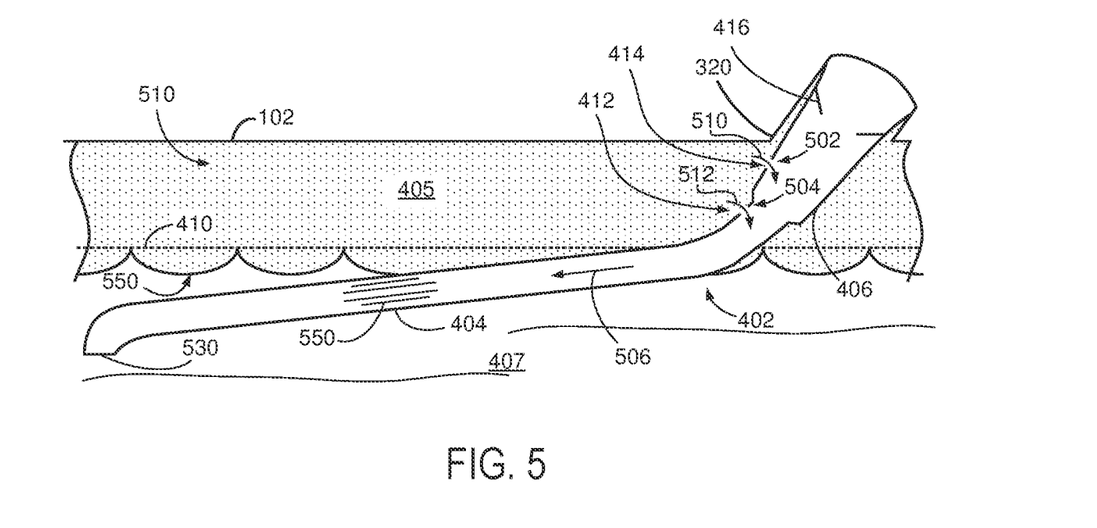
FIG. 5 shows a cutaway view of an example fuel fill tube.

The following description relates to systems and methods for managing fuel vapors in a fuel system that includes a side mount fuel tank. The side mount fuel tanks allow a single vehicle platform to be mated with a variety of different vehicle chassis that provide different functions. The present system and method allows this versatility to be maintained. FIG. 1 shows one example vehicle in which a side mount fuel tank is installed. The vehicle may include an engine that is of the type that is shown in FIG. 2. The vehicle may include a fuel vapor storage system as shown in FIG. 3. A cutaway view of an example side mount fuel tank is shown in FIG. 4. A cutaway view of an example fuel fill tube is shown in FIG. 5. The fuel system and fuel vapor storage system may be operated according to the method of FIG. 6.

Referring now to FIG. 1, vehicle 100 includes one or more fuel tanks 102 (e.g., side mount fuel tanks). The fuel tanks 102 may be mounted outside of frame rails 104. In this example, fuel tank 102 is mounted on a longitudinal side of frame rail 104. The longitudinal direction of frame rail 104 is indicated by arrow 106. The side mount fuel tank may be held in place via straps 108 in an area underneath door 110.

Referring now to FIG. 2, an example vehicle motive power source is shown. In this example, the vehicle motive power source is a spark ignition internal combustion engine. One cylinder of a multi-cylinder engine 230 in an engine system 200 is shown. Engine 230 may be controlled at least partially by a control system including a controller 12 and by input from an autonomous driver or controller 14. Alternatively, a vehicle operator (not shown) may provide input via an input device, such as an engine torque, power, or a driver demand input pedal (not shown).

A combustion chamber 232 of the engine 230 may be included with cylinder 234 and piston 236. The piston 236 may be coupled to a crankshaft 240 so that reciprocating motion of the piston is translated into rotational motion of the crankshaft. The crankshaft 240 may be coupled to at least one drive wheel of a vehicle via an intermediate transmission system. Further, a starter motor (not shown) may be coupled to the crankshaft 240 via a flywheel to enable a starting operation of the engine 230.

Combustion chamber 232 may receive intake air from an intake manifold 244 via an intake passage 242 and may exhaust combustion gases via an exhaust passage 248. The intake manifold 244 and the exhaust passage 248 can selectively communicate with the combustion chamber 232 via respective intake valve 252 and exhaust valve 254. In some examples, the combustion chamber 232 may include two or more intake valves and/or two or more exhaust valves.

In this example, the intake valve 252 and exhaust valve 254 may be controlled by cam actuation via respective cam actuation systems 251 and 253. The cam actuation systems 251 and 253 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 252 and exhaust valve 254 may be determined by position sensors 255 and 257, respectively. In alternative examples, the intake valve 252 and/or exhaust valve 254 may be controlled by electric valve actuation. For example, the cylinder 234 may alternatively include an intake valve controlled via electric valve actuation and an exhaust valve controlled via cam actuation including CPS and/or VCT systems.

A fuel injector 269 is shown coupled directly to combustion chamber 232 for injecting fuel directly therein in proportion to the pulse width of a signal received from the controller 12. In this manner, the fuel injector 269 provides what is known as direct injection of fuel into the combustion chamber 232. The fuel injector may be mounted in the side of the combustion chamber or in the top of the combustion chamber, for example. Fuel may be delivered to the fuel injector 269 by a fuel system (not shown) including a fuel tank, a fuel pump, and a fuel rail. In some examples, the combustion chamber 232 may alternatively or additionally include a fuel injector arranged in the intake manifold 244 in a configuration that provides what is known as port injection of fuel into the intake port upstream of the combustion chamber 232.

Spark is provided to combustion chamber 232 via spark plug 266. The ignition system may further comprise an ignition coil (not shown) for increasing voltage supplied to spark plug 266. In other examples, such as a diesel, spark plug 266 may be omitted.

The intake passage 242 may include a throttle 262 having a throttle plate 264. In this particular example, the position of throttle plate 264 may be varied by the controller 12 via a signal provided to an electric motor or actuator included with the throttle 262, a configuration that is commonly referred to as electronic throttle control (ETC). In this manner, the throttle 262 may be operated to vary the intake air provided to the combustion chamber 232 among other engine cylinders. The position of the throttle plate 264 may be provided to the controller 12 by a throttle position signal. The intake passage 242 may include a mass air flow sensor 220 and a manifold air pressure sensor 222 for sensing an amount of air entering engine 230.

An exhaust gas sensor 227 is shown coupled to the exhaust passage 248 upstream of an emission control device 270 according to a direction of exhaust flow. The sensor 227 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 227 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 270 is shown arranged along the exhaust passage 248 downstream of the exhaust gas sensor 227. The emissions control device 270 may be a three way catalyst (TWC), $NO_x$ trap, various other emission control devices, or combinations thereof. In some examples, during operation of the engine 230, the emission control device 270 may be periodically reset by operating at least one cylinder of the engine within a particular air-fuel ratio.

The controller 12 is shown in FIG. 2 as a microcomputer, including a microprocessor unit 202, input/output ports 204, an electronic storage medium for executable programs and calibration values shown as read only memory chip 206 (e.g., non-transitory memory) in this particular example, random access memory 208, keep alive memory 210, and a data bus. The controller 12 may receive various signals from sensors coupled to the engine 230, in addition to those signals previously discussed, including measurement of inducted mass air flow (MAF) from the mass air flow sensor 220; engine coolant temperature (ECT) from a temperature sensor 223 coupled to a cooling sleeve 214; an engine position signal from crankshaft position sensor 218 (or other type) sensing a position of crankshaft 240; throttle position from a throttle position sensor 265; and manifold absolute pressure (MAP) signal from the sensor 222. An engine speed signal may be generated by the controller 12 from crankshaft position sensor 218. Manifold pressure signal also provides an indication of vacuum, or pressure, in the intake manifold 244. Note that various combinations of the above sensors may be used, such as a MAF sensor without a MAP sensor, or vice versa. During engine operation, engine torque may be inferred from the output of MAP sensor 222 and engine speed. Further, this sensor, along with the detected engine speed, may be a basis for estimating charge (including air) inducted into the cylinder. In one example, the crankshaft position sensor 218, which is also used as an engine speed sensor, may produce a predetermined number of equally spaced pulses every revolution of the crankshaft.

The storage medium read-only memory 206 can be programmed with computer readable data representing non-transitory instructions executable by the processor 202 for performing at least portions of the methods described below as well as other variants that are anticipated but not specifically listed. Thus, controller 12 may operate actuators to change operation of engine 230. In addition, controller 12 may post data, messages, and status information to human/machine interface 213 (e.g., a touch screen display, heads-up display, light, etc.).

During operation, each cylinder within engine 230 typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 232 via intake manifold 244, and piston 236 moves to the bottom of the cylinder so as to increase the volume within combustion chamber 232. The position at which piston 236 is near the bottom of the cylinder and at the end of its stroke (e.g. when combustion chamber 232 is at its largest volume) is typically referred to by those of skill in the art as bottom dead center (BDC).

During the compression stroke, intake valve 252 and exhaust valve 254 are closed. Piston 236 moves toward the cylinder head so as to compress the air within combustion chamber 232. The point at which piston 236 is at the end of its stroke and closest to the cylinder head (e.g. when combustion chamber 232 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 266, resulting in combustion.

During the expansion stroke, the expanding gases push piston 236 back to BDC. Crankshaft 240 converts piston movement into a rotational torque of the rotary shaft. Finally, during the exhaust stroke, the exhaust valve 254 opens to release the combusted air-fuel mixture to exhaust passage 248 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 3, a block diagram of an example evaporative emissions system 300 is shown. Evaporative emissions system 300 includes a fuel tank 102, canister purge valve 302, a carbon filled canister 304, a canister vent valve 306, a fuel tank pressure sensor 308, a carbon canister temperature sensor 310, a fuel tank cap 330, and a fuel tank vent valve 312. Carbon filled canister 304 may include activated carbon 311 to store fuel vapors. The fuel tank vent valve 312 is placed along conduit 305. Conduit 305 extends from fuel tank 102 to carbon filled canister 304. Conduit 350 extends from carbon filled canister 304 to engine intake manifold 244.

Canister purge valve 302 may selectively provide fluidic communication between carbon filled canister 304 and intake manifold 244. Canister vent valve 306 may selectively provide fluidic communication between carbon filled canister 304 and atmosphere. Fuel tank vent valve 314 may selectively provide fluidic communication between fuel tank 102 and carbon filled canister 304.

Fuel 324 in fuel tank 102 may generate vapors that migrate to vapor space 326 within fuel tank 102 when fuel 324 is exposed to warm temperatures and agitation. Fuel vapors may migrate from vapor space 326 toward carbon filled canister 304 when canister purge valve 302 is open, fuel tank vent valve 314 is open, and canister vent valve 306 is open. Fuel may enter fuel tank by removing fuel tank cap 330 and delivering fuel to fuel inlet pipe 320.

When engine 230 is combusting fuel, canister purge valve 302 and canister vent valve 306 may be opened while fuel tank vent valve 314 is open or closed to purge fuel vapor from carbon filled canister 304 and fuel tank 102. Canister vent valve 306 and fuel tank vent valve 314 may be opened during filling of fuel tank 102 to allow fuel vapors to be stored in carbon filled canister 304.

Referring now to FIG. 4, a cutaway of fuel tank 102 is shown. Fuel tank 102 includes an area that is reserved for fuel vapor storage 405 and not liquid fuel as well as an area that is designated for liquid fuel storage 407. Maximum liquid fuel level threshold 410 divides the tank such that the area that is reserved for fuel vapor storage 405 and not liquid fuel is above the maximum liquid fuel level threshold 410 and the area that is designated for liquid fuel storage 407 is at and below the maximum liquid fuel level threshold 410. Fuel vapors are to be stored above maximum liquid fuel level threshold 410 without liquid fuel when fuel tank 102 is stationary and not moving, though liquid fuel may at times briefly enter the area that is reserved for fuel vapor storage 405 and not liquid fuel due to fuel sloshing within fuel tank 102. Fuel vapor and liquid fuel may occupy the area that is designated for liquid fuel storage 407.

Fuel tank 102 includes a fuel inlet pipe 320, and it, along with bracket 420 supports a fuel fill pipe 402. Fuel fill pipe 402 may include fuel nozzle directing device 416, a fuel cup 406, and a fuel distribution pipe 404 that is directly coupled to the fuel cup 406. Fuel cup 406 may include a hole 414 that allows fuel vapors to be drawn into the fuel cup 406 from the area that is reserved for fuel vapor storage 405 and not liquid fuel during filling of fuel tank 102. In addition, or alternatively, fuel distribution pipe 404 may include a hole 412 that allows fuel vapors to be drawn into the fuel distribution pipe 404 from the area that is reserved for fuel vapor storage 405 and not liquid fuel during filling of fuel tank 102. When fuel nozzle 425 delivers liquid fuel to fuel tank 102, the fuel travels in the fuel cup 406 and the fuel distribution pipe 404 at a velocity that lowers pressure within the fuel cup 406 and the fuel distribution pipe 404. This lower pressure allows fuel vapors to enter the fuel cup 406 and/or the fuel distribution pipe 404 via hole 412 or hole 414. The fuel vapors that flow into the fuel cup 406 and/or fuel distribution pipe 404 may reduce the amount of fuel vapor that may be desired to be stored in the fuel vapor canister. Thus, the hole in the fuel fill pipe may enable a smaller carbon filled canister to be used in the fuel vapor storage system.

Referring now to FIG. 5, a closer view of fuel fill pipe 402 is shown. The components, areas, and elements that are identified in FIG. 5 with the same numerical identifiers that are shown in FIG. 4 are the same components, areas, and elements.

In this figure, fuel inlet pipe 320 is shown supporting fuel fill pipe 402 at the fuel cup 406. Low pressure areas 502 and/or 504 may be generated when liquid fuel is flowing into fuel fill pipe 402. Liquid fuel 550 flows into fuel fill pipe 402 in the direction that is indicated by arrow 506. Thus, according to the direction of liquid fuel flow, hole 412 is downstream of hole 414 and fuel cup 406. Fuel vapors may flow from the area that is reserved for fuel vapor storage 405 and not liquid fuel and into fuel fill pipe 402 in the direction that is indicated by arrows 510 and 512.

Fuel nozzle directing device 416 directs fuel flow from fuel nozzle 425 in the direction of fuel distribution pipe 404 so that a liquid seal may be formed between the fuel that is flowing through the fuel distribution pipe 404 and liquid fuel 550 that is flowing in the fuel distribution pipe 404. The liquid seal may prevent gases from entering end 530 of fuel fill pipe 402 and migrating toward atmosphere and fuel inlet pipe 320, thereby reducing evaporative emissions. Further, the flowing fuel allows the fuel vapors to be directed from hole 412 and/or hole 414 to the end 530 of fuel fill pipe 402. At least a portion of fuel vapor that flows through hole 412 and/or 414 may return back to liquid fuel.

It may be observed that fuel inlet pipe 320 does not include a conduit or hose that extends directly (e.g., with no intermediate devices other than the hose) from fuel inlet pipe 320 to a carbon filled canister. Further, fuel inlet pipe 320 does not include a conduit or hose that extends directly (e.g., with no intermediate devices other than the hose) from fuel inlet pipe 320 to a valve. Similarly, fuel fill pipe 402 does not include a conduit or hose that extends directly (e.g., with no intermediate devices other than the hose) from fuel fill pipe 402 to the carbon filled canister. Additionally, fuel fill pipe 402 does not include a conduit or hose that extends directly (e.g., with no intermediate devices other than the hose) from fuel fill pipe 402 to a valve.

The system of FIGS. 1-5 provides for a fuel system, comprising: a side mount fuel tank configured to mount outside of frame rails of a vehicle, the side mount fuel tank including a fuel fill inlet and a fuel fill pipe that extends inside the side mount fuel tank beginning at the fuel filler inlet and ending within the side mount fuel tank, the fuel fill pipe including a hole positioned within an area of the side mount fuel tank that is outside of an area allocated to liquid fuel. In a first example, the fuel system includes where the area is a fuel vapor storage area that is above a maximum liquid fuel fill level when the side mount fuel tank is mounted to a vehicle. In a second example that may include the first example, the fuel system includes where the fuel fill pipe is positioned within at least a portion of the fuel fill inlet, and where the fuel fill pipe is completely enclosed via the side mount fuel tank. In a third example that may include one or both of the first and second examples, the fuel system includes where the hole is positioned in a filler cup of the fuel fill pipe. In a fourth example that may include one or more of the first through third examples, the fuel system includes where the hole is positioned downstream of the filler cup. In a fifth example that may include one or more of the first through fourth examples, the fuel system further comprises a carbon filled canister and a conduit extending from the side mount fuel tank to the carbon filled canister. In a sixth example that may include one or more of the first through fifth examples, the fuel system further comprises a fuel tank vent valve positioned along the conduit. In a seventh example that may include one or more of the first through sixth examples, the fuel system of further comprises a second conduit extending from the carbon filled canister to an engine intake manifold.

The system of FIGS. 1-5 also provides for a fuel system, comprising: a side mount fuel tank configured to mount outside of frame rails of a vehicle, the side mount fuel tank including a fuel fill inlet and a fuel fill pipe that extends inside the side mount fuel tank beginning at the fuel filler inlet and ending within the side mount fuel tank, the fuel fill pipe not directly coupled to a conduit or hose that extends from the fuel fill pipe to a carbon filled canister. In a first example, the fuel system includes where the fuel fill inlet does not include a conduit or hose that extends directly from the fuel filler inlet to the carbon filled canister. In a second example that may include the first example, the fuel system includes where the fuel fill inlet does not include a conduit or hose that extends directly from the fuel filler inlet to a valve. In a third example that may include one or both of the first and second examples, the method includes where the fuel fill pipe is not directly coupled to a conduit or hose that extends from the fuel fill pipe to the carbon filled canister. In a fourth example that may include one or more of the first through third examples, the method includes where the fuel fill pipe is not directly coupled to a conduit or hose that extends from the fuel fill pipe to a valve.

Figure 6:
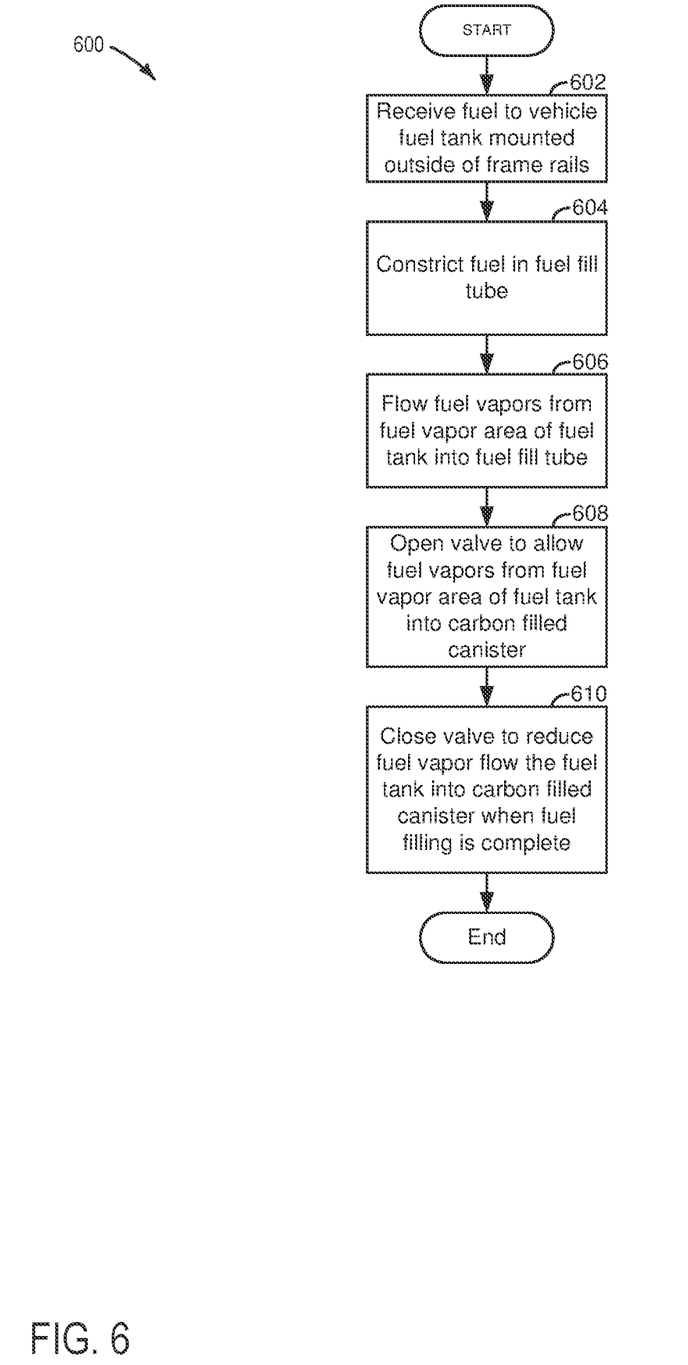
FIG. 6 shows a flowchart of an example method for operating an evaporative emissions system.

Referring now to FIG. 6, an example method 600 for controlling fuel vapors in a fuel tank is shown. At least portions of method 600 may be performed via components of an evaporative emissions system while other portions of method 600 may be performed via a controller or human. For portions of method 600 that are performed via a controller, the method may perform the actions via executable instructions that are stored in non-transitory memory. The controller and/or human may cooperate with a system as shown in FIGS. 1-5. Method 600 may cause the controller to actuate the actuators in the real world and receive data and signals from sensors described herein when method 600 is realized as executable instructions stored in controller memory.

At 602, method 600 receives fuel to a fuel tank. The fuel tank may be a side mount fuel tank as shown in FIGS. 1 and 3-5. The fuel may be supplied via a human operating a fuel nozzle or via an automated process. Method 600 proceeds to 604.

At 604, method 600 constricts fuel that is supplied to the fuel tank via a fuel fill tube. In particular, a fuel cup of the fuel fill tube may begin at a larger cross sectional area and end at a smaller cross sectional area. In one example, the fuel may be constricted to flow through an area that is less than 125% of the cross sectional area of the fuel nozzle that supplied the fuel. By constricting the fuel that is released from the fuel fill nozzle, it may be possible to produce a liquid seal that operates to reduce flow of gases from the end of the fuel fill tube to the fuel inlet pipe. Method 600 proceeds to 606.

At 606, method 600 flows fuel vapors from an area of the fuel tank that is reserved for fuel vapors and that is above a maximum fill level of the fuel tank to inside a fuel fill pipe via a hole in the fuel fill pipe. Fuel vapors in the fuel tank may be drawn into the fuel fill pipe via fuel flowing into the fuel fill pipe and generating a low pressure region in the fuel fill pipe. The fuel vapors that are drawn into the fuel fill pipe may reduce the amount of vapors that are to be drawn into the carbon filled canister. In this way, the hole in the fuel fill pipe may be applied to reduce an amount of fuel vapor that is stored in the carbon filled canister. Method 600 proceeds to 608.

At 608, method 600 opens a fuel tank vent valve while an engine is running (e.g., rotating and combusting air and fuel) to release fuel vapors from the fuel tank to the engine intake manifold. In one example, method 600 may open the fuel tank vent valve in response to a pressure in the fuel tank. Additionally, method 600 may open a canister purge valve while the fuel tank vent valve is open so that fuel vapors may be consumed and combusted via the engine. During situations when the engine is not running and is stopped, method 600 may close the canister purge valve and open a canister vent valve while the fuel tank vent valve is open. Opening the canister vent valve allows fuel vapors to flow through the carbon canister where fuel vapors may be stored. Air may flow out of carbon filled canister and to atmosphere. Method 600 proceeds to exit.

At 610, method 600 closes a fuel tank vent valve to reduce fuel vapor flow into the carbon filled canister when filling of the fuel tank is complete. Method 600 may judge that fuel tank filling is complete when pressure in the fuel tank ceases to increase or when a fuel cap is installed to the fuel tank. Method 600 proceeds to exit.

In this way, fuel vapors in a fuel system may be stored in a carbon filled canister even if the fuel tank is a side mount fuel tank. Additionally, a hole in the fuel fill pipe may reduce an amount of fuel vapor that is stored in the carbon filled canister so that the carbon filled canister may be a smaller volume carbon filled canister.

Thus, method 600 provides for a method for operating a vehicle emissions system, comprising: flowing gases from an area of a fuel tank into a fuel fill pipe while a fuel is flowing into the fuel fill pipe; and storing fuel vapors from the fuel tank in a carbon filled canister while the fuel is flowing into the fuel fill pipe. In a first example, the method includes where the gases flow into a hole in the fuel fill pipe. In a second example that may include the first example, the method further comprises opening a fuel tank vent valve to allow the fuel vapors to flow from the fuel tank to the carbon filled canister. In a third example that may include one or more of the first and second examples, the method includes where the gases include fuel vapors. In a fourth example that may include one or more of the first through third examples, the method includes where the fuel tank is a side mount fuel tank configured to mount outside of frame rails of a vehicle. In a fifth example that may include one or more of the first through fourth examples, the method includes where the fuel fill pipe is at least partially inside of a fuel fill inlet to the fuel tank. In a sixth example that may include one or more of the first through fifth examples, the method includes where the gases are drawn from the area of the fuel tank via a low pressure area in the fuel fill pipe.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel system, comprising:
a side mount fuel tank configured to mount outside of frame rails of a vehicle, the side mount fuel tank including a fuel fill inlet and a fuel fill pipe that extends inside the side mount fuel tank beginning at the fuel fill inlet and ending within the side mount fuel tank, the fuel fill pipe including a first hole,
where the first hole is located inside of the side mount fuel tank within a fuel vapor storage area,
where the first hole is positioned on a side of the fuel fill pipe that separates the inside of the side mount fuel tank from a fuel flow path,
where the first hole facilitates vapor communication between the fuel vapor storage area and the fuel flow path of the fuel fill pipe, and
where the fuel vapor storage area is an area that is above a maximum liquid fuel fill level when the side mount fuel tank is mounted to a vehicle.

2. The fuel system of claim 1, where the fuel fill pipe includes a plurality of holes, located on the inside of the side mount fuel tank within the fuel vapor storage area, where the plurality of holes are on the side of the fuel fill pipe, where the plurality of holes facilitate vapor communication between the fuel vapor storage area and the fuel flow path of the fuel fill pipe, and where the plurality of holes includes the first hole and at least one additional hole.

3. The fuel system of claim 1, where the fuel fill pipe is positioned within at least a portion of the fuel fill inlet, and where the fuel fill pipe is completely enclosed via the side mount fuel tank.

4. The fuel system of claim 1, where the first hole is positioned in a filler cup of the fuel fill pipe.

5. The fuel system of claim 4, where a second hole is positioned downstream of the first hole in a fuel distribution pipe coupled to the filler cup.

6. The fuel system of claim 1, further comprising a carbon filled canister and a conduit extending from the side mount fuel tank to the carbon filled canister.

7. The fuel system of claim 6, further comprising a fuel tank vent valve positioned along the conduit.

8. The fuel system of claim 7, further comprising a second conduit extending from the carbon filled canister to an engine intake manifold.

9. A method for operating a vehicle emissions system, comprising:
flowing gases from a fuel vapor storage area of a fuel tank, through a first hole positioned on a side of a fuel fill pipe, directly into the fuel fill pipe while a fuel is flowing through the fuel fill pipe, where the fuel vapor storage area of the fuel tank is an area above a maximum liquid fuel fill level, where the side of the fuel fill pipe separates an inside of the fuel tank from the fuel flowing through the fuel fill pipe, and where the first hole facilitates communication between the flowing gases from the fuel vapor storage area of the fuel tank and the fuel flowing into the fuel fill pipe; and
storing fuel vapors from the fuel tank in a carbon filled canister while the fuel is flowing into the fuel fill pipe.

10. The method of claim 9, where the gases flow into a second hole on the side of the fuel fill pipe positioned downstream from the first hole, while the fuel is flowing into the fuel fill pipe along the fuel flow path, and where the second hole facilitates communication between the area of the fuel tank and the fuel flow path.

11. The method of claim 9, further comprising opening a fuel tank vent valve to allow the fuel vapors to flow from the fuel tank to the carbon filled canister.

12. The method of claim 9, where the gases include fuel vapors.

13. The method of claim 9, where the fuel tank is a side mount fuel tank configured to mount outside of frame rails of a vehicle.

14. The method of claim 9, where the fuel fill pipe is at least partially inside of a fuel fill inlet to the fuel tank.

15. The method of claim 9, where the gases are drawn from the area of the fuel tank via a low pressure area in the fuel fill pipe.

16. A fuel system, comprising:
a fuel tank, the fuel tank including a fuel fill inlet and a fuel fill pipe that extends inside the fuel tank beginning at the fuel fill inlet and ending within the fuel tank, where the fuel fill pipe includes a first hole positioned on a side of the fuel fill pipe that separates the inside of the fuel tank from a fuel flow path, where the first hole is located in a fuel vapor storage area, where the first hole facilitates communication between the fuel vapor storage area and the fuel flow path of the fuel fill pipe, where the vapor storage area is an area above a maximum liquid fuel fill level inside the fuel tank, and where the fuel fill pipe is not directly coupled to a first conduit or hose that extends from the fuel fill pipe to a carbon filled canister.

17. The fuel system of claim 16, where the fuel fill inlet does not include a second conduit or hose that extends directly from the fuel fill inlet to the carbon filled canister.

18. The fuel system of claim 17, where the fuel fill inlet does not include a third conduit or hose that extends directly from the fuel fill inlet to a valve.

19. The fuel system of claim 16, where the fuel fill pipe includes a filler cup.

20. The fuel system of claim 16, where the fuel fill pipe is not directly coupled to a second conduit or hose that extends from the fuel fill pipe to a valve.

* * * * *